United States Patent [19]

Flaherty et al.

[11] 3,761,876

[45] Sept. 25, 1973

[54] RECOGNITION UNIT FOR OPTICAL CHARACTER READING SYSTEM

[75] Inventors: Larry Paul Flaherty; William Alton Hale, both of Dallas, Tex.

[73] Assignee: Recognition Equipment Incorporated, Dallas, Tex.

[22] Filed: July 28, 1971

[21] Appl. No.: 166,802

[52] U.S. Cl. .......................................... 340/146.3 MA, 340/146.3 H

[51] Int. Cl. .......................................... G06k 9/06

[58] Field of Search .............. 340/146.3, 146.3 MA, 340/146.3 AG, 146.3 H

[56] References Cited

UNITED STATES PATENTS

| | | | |
|---|---|---|---|
| 3,234,513 | 2/1966 | Brust | 340/146.3 MA |
| 3,246,296 | 4/1966 | Heizer et al. | 340/146.3 MA |
| 3,484,747 | 12/1969 | Nunley | 340/146.3 AG |
| 3,644,890 | 2/1972 | Matthews | 340/146.3 AG |
| 3,676,847 | 7/1972 | Partin | 340/146.3 MA |

*Primary Examiner*—Maynard R. Wilbur
*Assistant Examiner*—Leo H. Boudreau
*Attorney*—Richards, Harris & Hubbard

[57] ABSTRACT

A recognition unit accepts normalized character data from a multicell, single columnar retina across which a character image is scanned and converts the serial stream of digital character data into a parallel format for each scan and then correlates the data by comparing each cell with a composite of the surrounding cells to establish a black or white digital signal for each cell position. The signals are stored in a matrix array which is vertically analyzed to locate the character dependent cells. The character data is then shifted into a storage matrix and applied to a plurality of digital character masks for selection of the character represented by the data.

13 Claims, 9 Drawing Figures

INVENTORS:
LARRY P. FLAHERTY
WILLIAM A. HALE

Richards, Harris & Hubbard
ATTORNEYS

Patented Sept. 25, 1973 3,761,876

7 Sheets-Sheet 2

INVENTORS:
LARRY P. FLAHERTY
WILLIAM A. HALE

*Richards, Harris & Hubbard*
ATTORNEYS

INVENTORS:
LARRY P. FLAHERTY
WILLIAM A. HALE

Richards, Harris & Hubbard
ATTORNEYS

INVENTORS:
LARRY P. FLAHERTY
WILLIAM A. HALE

Richards, Harris & Hubbard
ATTORNEY

INVENTORS:
LARRY P. FLAHERTY
WILLIAM A. HALE

Richards, Harris & Hubbard
ATTORNEYS

INVENTORS:
LARRY P. FLAHERTY
WILLIAM A. HALE

Richards, Harris & Hubbard
ATTORNEYS

INVENTORS:
LARRY P. FLAHERTY
WILLIAM A. HALE

Richards, Harris & Hubbard
ATTORNEYS

RECOGNITION UNIT FOR OPTICAL CHARACTER READING SYSTEM

BACKGROUND OF THE INVENTION

1. Field of the Invention

The invention relates to a recognition unit for an optical character reading system, and more particularly, to a recognition unit responsive to purely digital character information.

2. History of the Prior Art

Prior art optical character recognition systems have operated upon either a purely analog analysis basis or have employed combined digital and analog techniques. Purely digital recognition systems have encountered substantial difficulty particularly in the step of correlating character data prior to application of that data to character masks. The present recognition unit provides digital averaging and dual threshold correlation successfully to eliminate many of the prior art difficulties.

The present character recognition system processes character information purely digitally. Such capability yields substantial advantages both as to speed and accuracy.

SUMMARY OF THE INVENTION

In accordance with the invention the comparative blackness of a cell within a character cell array is uniquely correlated to generate a black or white data signal for each cell. The values of the cells surrounding the data point cell are summed with the value of the data point cell. The sum is then biased in the black direction by a programmable quantity. The value of the data point cell is multiplied by the number of cell values summed and compared with the cell value sum. A relative black signal is generated if the cell value sum is greater. A programmable absolute black threshold signal is generated, compared with the data point cell value and an absolute black signal is generated if the cell value is greater. A black digital signal is generated for the data point cell in response to the presence of either a relative black signal or an absolute black signal. A white signal is generated for the data point cell in response to the absence of both a relative black signal and an absolute black signal.

BRIEF DESCRIPTION OF THE DRAWING

For a more complete understanding of the present invention and for further objects and advantages thereof, reference may now be had to the following description taken in conjunction with the accompanying drawing in which.

DETAILED DESCRIPTION

Figure 1:
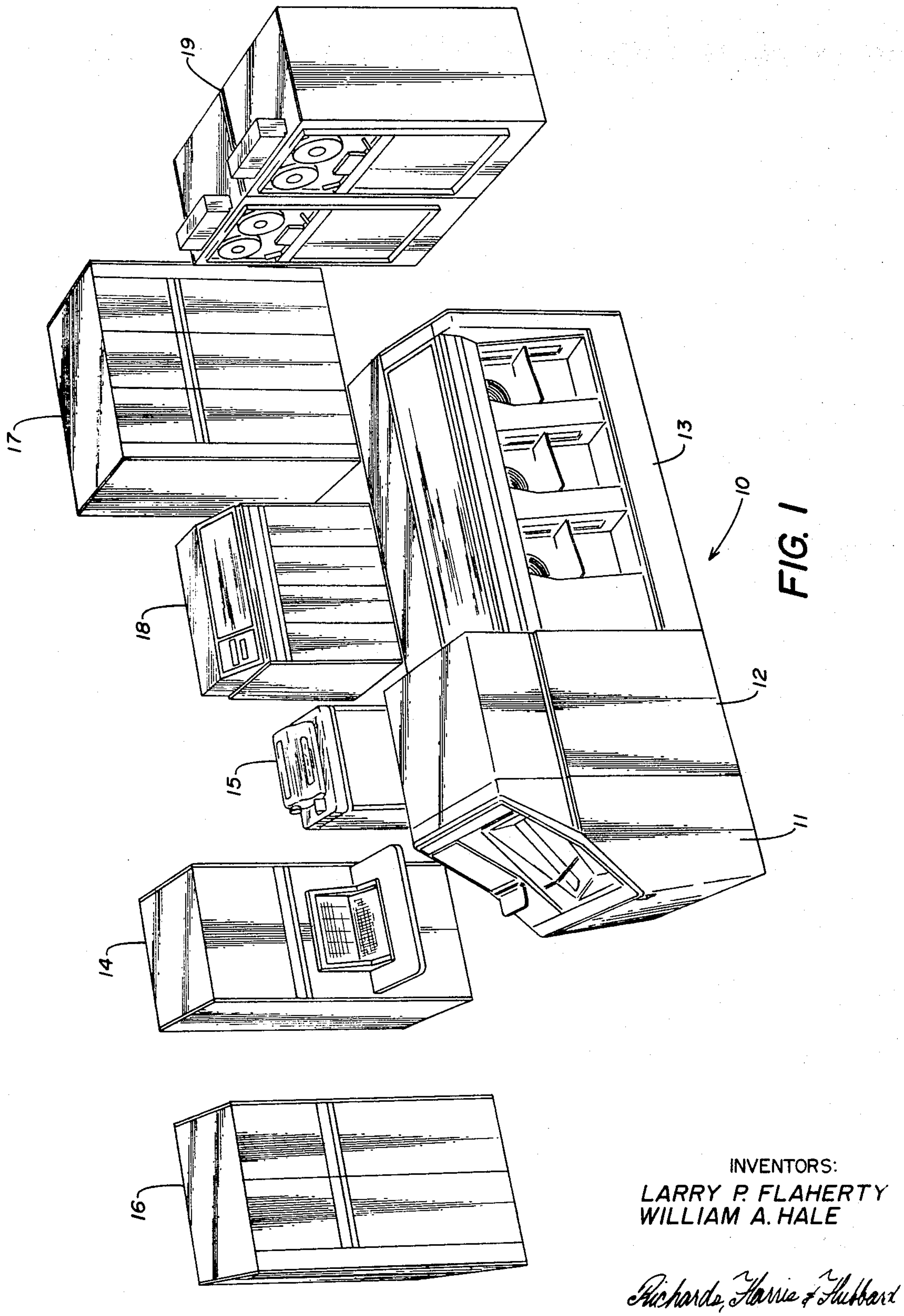
FIG. 1 is a layout of units in the system wherein the recognition unit of the present invention is embodied.

The present recognition unit may be best understood by reference to its relation to a complete document reading system. Referring now to FIG. 1, a page processor 10 is employed for the feeding, scanning and stacking of documents. The page processor comprises a feeder unit 11, a transport scanning unit 12 including a normalizer and a stacking unit 13. Peripheral equipment to the system comprises a control console 14, an *I/O* unit 15, a peripheral control unit 16, a recognition unit 17 to which the present invention is directed and which includes logic circuitry for the recognition of characters of fixed fonts as well as characters of handprint execution, a line printer 18 and a tape transport unit 19.

The system shown in FIG. 1 has the capability of accepting 9 × 14 inch documents with single spaced full coverage of the document. The system is capable of reading and completely transferring to storage, to line printer 18 or tape transport 19 all of the information on such documents at rates of the order of about 30 pages per minute. On the other hand, credit card type documents, wherein the reading is to be accomplished on one or two lines only, can be processed by the present system at the rate of up to 300 cards per minute. The system operates by placing into a hopper in feeder 11 a stack of documents to be read, feeding the documents one at a time into the tape transport and scanning unit 12, and then delivering the documents to the stacking unit 13 wherein the stacking can be selectively dependent upon any coded information on the documents themselves.

In order to provide an understanding of the setting in which the present invention finds itself and the desirability for the unique capabilities of the recognition unit of the present invention, the line diagram of FIG. 2 will be described.

Figure 2:
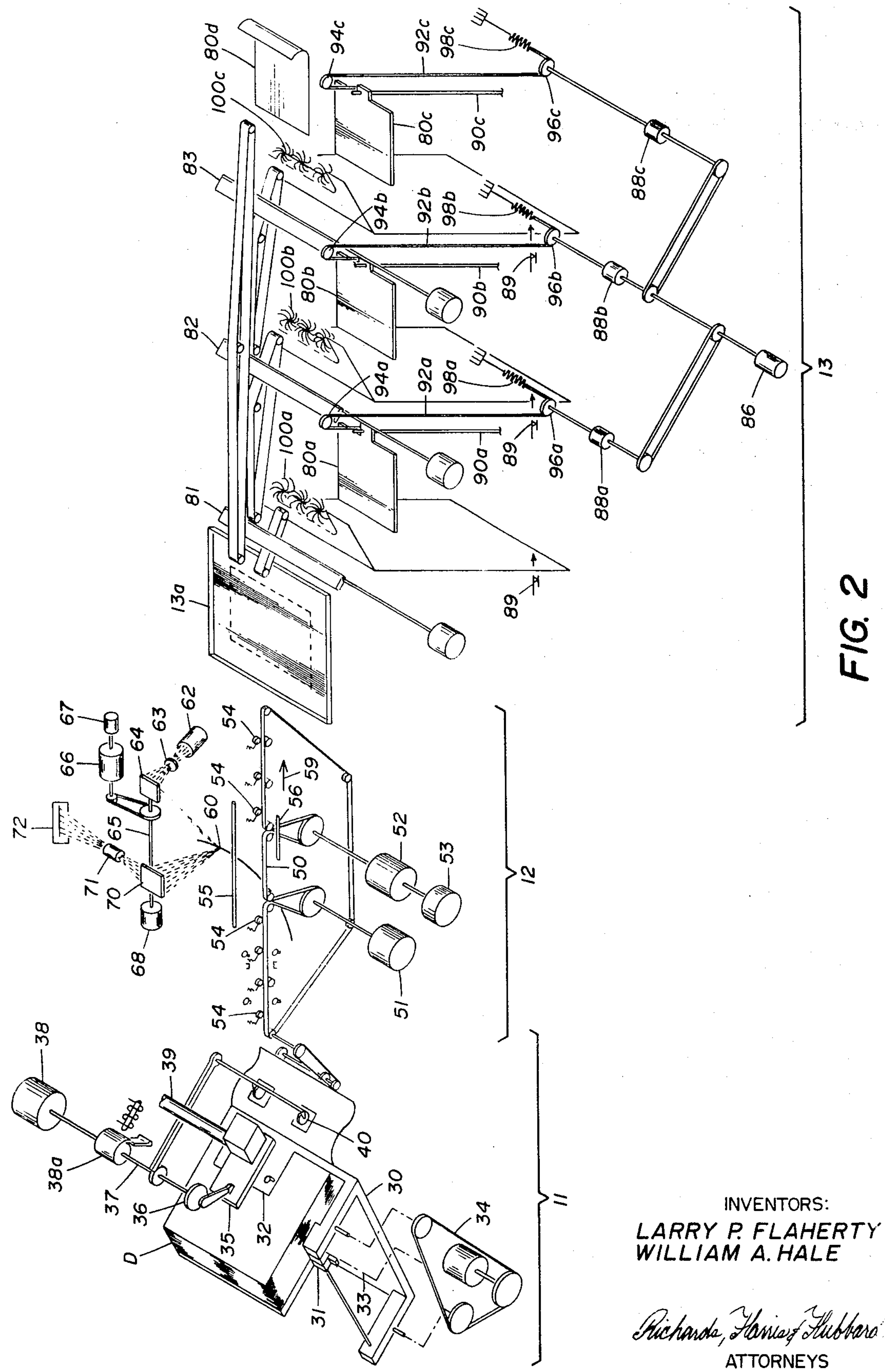
FIG. 2 is a diagrammatic representation of the mechanical portions of the rapid page processor unit of FIG. 1.

Referring now to FIG. 2, a document feeder 11 has been illustrated as comprising a tray 30 in which a stack *D* of documents may be placed with the documents being oriented as to stand on the bottom edge thereof. A paddle 31 is slidably mounted to move the documents forward against a shuttleplate unit 32. The paddle 31 is linked mechanically as by linkage 33 to a chain 34 which is servo driven to maintain the documents in a given density in the region of the face of the shuttleplate unit 32. A shuttleplate 35 is reciprocated through a crank unit 36 on a shaft 37 driven by a feeder motor 38 through a single revolution clutch 38*a*. The shuttleplate 35 has a plurality of apertures formed through it. A vacuum is maintained in the apertures through a vacuum system connected to an exhaust pipe 39. By this means, individual documents are sequentially removed from the stack D and are moved downwardly into engagement with a set of pinch rollers that are diagrammatically represented at 40.

The pinch rollers 40 direct each document into the document transport scanning unit 12 wherein the document is advanced by a belt 50 that is driven by a pair of servo motors 51 and 52 in response to a position encoder 53 and a suitable control system. Documents are maintained in contact with the belt 50 by a series of rollers 54 as well as by jets of air that are directed downwardly from parallel tubes 55 and 56 positioned above and on opposite sides of the belt 50. In the region of arc 60, the documents are drawn into a fixed position against a bedplate by a plurality of vacuum ports (not shown). Arc 60 represents the scan location of documents traveling under the action of the belt 50, and the arrow 59 represents the direction of travel of the documents.

At the scan location, light from a high intensity lamp 62 passes through a lens system 63 onto an oscillating mirror 64 and is projected and focused onto a scan point on arc 60. The mirror 64 is mounted on a shaft 65 that is driven by a servo motor 66 having a servo tachometer 67 associated therewith and an encoder 68 responsive to the movement of the shaft 65. A scanning mirror 70 is mounted on the shaft 65 for oscillation with the mirror 64. Light reflected from the mirror 70 passes through a lens system 71 onto a columnar retina 72. In one embodiment of the system, the retina 72 is provided with 96 active cells and is operated such that characters viewed by the retina as the light beam sweeps arc 60 actually fall on or energize 16 cells for a normal character, i.e., a character of usual type print height. The remainder of the cells of the retina are employed in the system for locating the next line to be scanned and for providing control signals to the servo motors 51 and 52, whereby the document is properly positioned for the initiation of the scan of the next line.

Once scanned, each document is fed to a rest station 13*a* at the input of the stacker unit 13. The movement of the document is arrested at the rest station to permit the stacker unit to respond to control instructions. Then in accordance with such control instructions, the document is delivered, either to a selected one of three bins 80*a*, 80*b*, and 80*c*, or to a reject bin 80*d*. The movement of documents in the stacker unit 13 is under the control of stacker gates 81, 82 and 83, and spiral stacking wheels are employed to deliver documents to the selectable bins 80*a*, 80*b*, and 80*c*.

In order to accommodate documents of different weights, a positive control is provided through a stacker motor 86 operating through clutches 88*a*, 88*b*, and 88*c* to maintain the top of the stack of the documents on each of th paddles 80*a–c*, respectively, in a predetermined relation to the periphery of the spiral stacking wheels. In each bin, the document level is sensed by photocells to control the respective clutches 88*a–c*.

Within this environment, the document stacker 13 of the present invention is called upon to provide a reliable feed and stacking of documents to the system in each of the many various conditions that may be prescribed by a user. The system of FIGS. 1 and 2 thus may operate in a wide variety of conditions and thus may be termed a universal document reader, being limited only by the maximum size of documents that can be accommodated in the document transport and stacking systems.

Photoelectric sensors 89, not shown, are disposed adjacent the paddles 80*a–c* and control the operation of the stacker motor 86. The paddles 80*a–c* are respectively slidably mounted upon shafts 90*a–c* and are moved along the shafts 90*a–c* by operation of suitable belts or chains 92*a–c*. Chains 92*a–c* are reaved over pulleys 94*a–c* and 96*a–c*. Each of the chains 92*a–c* is respectively coupled through negators spring 98*a–c*, with the end of each of the constant force springs being connected to a rigid frame. Operation of the stacker motor 86 may then move the chains 92*a–c* to move the paddles 80*a–c* vertically along the shafts 90*a–c*, in order to maintain the stack of documents thereon in a predetermined relationship to stacking wheels 100*a–c*. Wheels 100*a–c* serve to decelerate and stack documents fed from the rest station 13*a*. For further description of the control of deflecting blades for selective stacking of documents with a plurality of pockets, reference is made to U.S. Pat. No. 3,460,673, issued on Aug. 12, 1969, to the present assignee.

Within this environment, the recognition unit of the present invention is called upon to provide reliable recognition of scanned character data from documents fed to the system in each of the many various conditions that may be prescribed by a user. The system of FIGS. 1 and 2 thus may operate in a wide variety of conditions and thus may be termed a universal document reader, being limited only by the maximum size of documents that can be accommodated in the document transport and stacking systems.

The optical character recognition system which incorporates the recognition unit of the present invention includes a multi-font page reader which has the capability of reading and recognizing characters having a wide variation of sizes and fonts. Character size and font variations present a critical requirement for optical character readers. For maximum flexibility a system should be capable of handling and optically processing characters of various styles. The optical scanner employed in the present character recognition system is disclosed and claimed in application Ser. No. 166,736 filed July 28, 1971 and possesses the capability of scanning and obtaining data from characters whose heights vary from 0.112 inches to 0.224 inches, that is, over a range with limits having a ratio of 2:1.

When it is desired to read characters over a substantially wide range of character sizes, the recognition unit must respond to data of a wide range of character height or the apparent size of the electrical representation of a character image must be reduced to a standard size and format before being transmitted to the recognition unit. One system with which the present invention co-operates includes a normalizer as disclosed and claimed in application Ser. No. 166,811 filed July 28, 1971. The normalizer accepts data from the scanner and reduces that data into a uniform format. The scanner employs a single, vertically oriented columnar retina which produces a serial stream of data corresponding to a vertical scan through the character space. The sample period of the scanner is set to obtain 36 scans per character when reading at a speed of 300 document inches per second. A vertical sample window within the columnar retina is set to accommodate three character heights to allow for character misregistration. The number of vertical photocells registered with a character varies from 48 for a nominal 0.112 inch character to 96, for a 0.224 inch character. Normalizer output is always in terms of a 48 cell window height and a 16 cell character height. Each character is represented in a 16 cell high by 12 cell wide mosaic. The columnar retina senses only vertical slices of the character at a given instant of time. The horizontal dimension of a character is created by the number of scans or slices taken in a fixed amount of time.

The characters passing the scanner are sampled at such a rate that a vertical section of a character the width of the photocells comprising the columnar retina, that is, 0.014 inches, is sampled three times as it passes across the retina. The normalizer output is a serial stream of four bit digital words each of which correspond to the black/white level of each one of the cells in an equivalent 48 cell high window for each scan of the character. A white cell is represented by the digital word 0000 while a black cell is represented by the digital word 1111. Levels of "gray" in between black and white are represented by the 14 remaining states in the four bit code. The black/white code is transmitted from the normalizer to the recognition unit along with synchronizing clock pulses and a begin scan pulse which marks the beginning of a stream of four bit data words corresponding to a vertical scan through a character.

General System Operation

Figure 3:
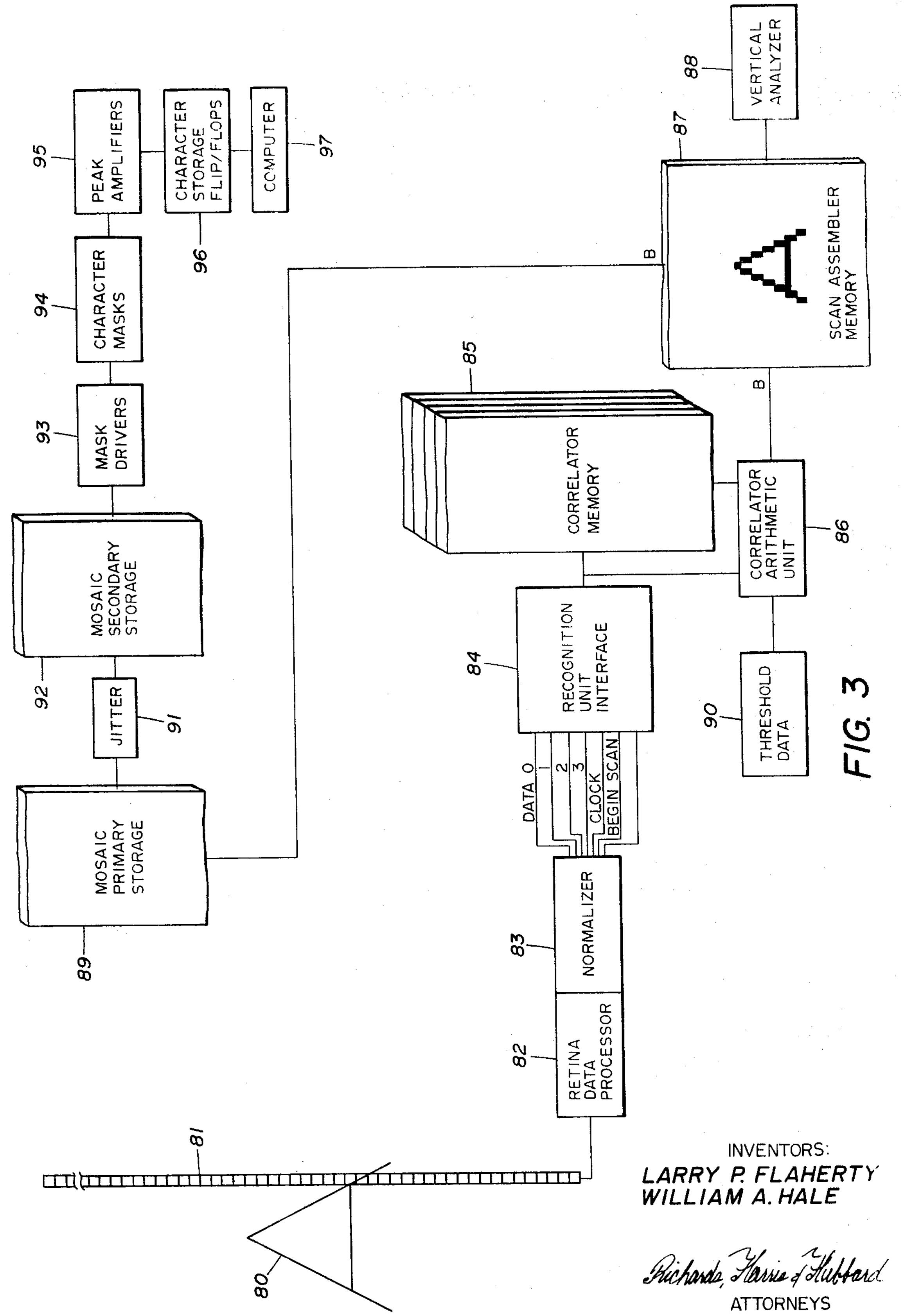
FIG. 3 is an illustrative block diagram of the recognition unit of the present invention.

Referring now to FIG. 3, an overall system block diagram of the recognition unit of the present invention is shown. As the image of a character 80 moves across the columnar retina 81, the retina is scanned and the output of each one of the photocells comprising the retina is sampled in sequence.

The retina 81 comprises a single columnar array of 96 photocells across which the image 80 of successive characters is projected by the optical portion of the system. The photodiode retina 81 is a linear monolythic array of silicon photodiodes consisting of 96 elements placed in a column. In one embodiment each element had an active area on the order of 0.014 inches wide by 0.012 inches high. The elements were spaced from one another a distance on the order of 0.014 inches center to center.

When the image 80 of a character to be recognized passes across the column of photocells 81, a portion of the character height extends in a direction from top to bottom of the columnar array and exposes only a fraction of the number of cells in the array. The outputs of the cells in the array are scanned from bottom to top at such a vertical section of a character of 0.007 inches wide is sampled three times before it completes its traverse scan of the array. Obviously a character having a nominal height of 0.112 inches will only extend to cover half the number of photocells as the same character having a height of 0.224 inches. With the data gathered from the smaller character by scanning the photocell outputs different from the data gathered from a larger identical character, the data must be normalized before being output to the recognition unit.

The data from the retina 81, obtained by scanning the photocell outputs is processed by the retina data processor 82 which includes an analog to digital converter and a normalizer 83. The normalizer accepts data gathered from any of the various types and sizes of character fonts which the system is capable of processing and reduces the data into a common format of signals indicative of a pre-selected size character regardless of the actual size of the character being processed. The format of the data, reduced by the normalizer, is a serial stream of four bit digital words each of which is indicative of the light/dark output of a normalized photocell. Each one of the four bit data words is indicative of a particular cell condition on a particular scan of the character being processed. During each scan, information from 48 cells is transmitted as an output from the normalizer. 36 scans are made for each character processed. The four bit data words are transmitted to a recognition unit interface 84 along with a clock pulse for each data word and a begin scan signal which indicates the beginning of data from the next succeeding scan of the character.

The serial data from the normalizer is processed by the interface unit and converted from serial to parallel by storage within a correlator memory 85. The memory 85 stores an array of four bit data words arranged in a 12 by 40 eight word matrix. The stored data is prerecognition processed by a correlator arithmetic unit 86 which examines the black/white level indicated for each cell in the array by comparing it both to the average of a plurality of its surrounding cells and to a threshold data signal produced by the process control computer. The correlator arithmetic control unit 86 makes a decision for each and every cell as to whether it should be considered black or white so that a definite decision is made before recognition is attempted. A "*B*" signal is transmitted for each and every cell stored in the correlator memory. If "*B*" is not true, the cell is considered "*W*".

The "*B*" signals from the correlator arithmetic unit are loaded into a scan assembler memory 87 in a 1 × 35 × 48 matrix, one black signal for each cell examined. While in the scan assembly memory, the stored cell data is examined by a vertical analyzer 88 which determines where within the 48 cell high array the center of the character is located. Each character is, in actuality, approximately 16 cells in height but because of the variation in orientation of the character image 80 as it passes across the columnar retina 81, the character data could be stored anywhere between the top and bottom of the scan assembly memory 87.

Once a decision is made by the vertical analyzer 88 as to the location of the character data within the memory, the data is passed to a mosaic primary storage array 89 which is a 12 cell by 18 cell matrix, a *W* bit being stored for each cell. It is to be noted that the mosaic primary storage array is loaded by shifting data in from the bottom. The output of the mosaic primary storage is under control of a jitter unit 91 and a data is passed into a secondary storage array 92 which is in turn connected to a plurality of mask driver units 93. The secondary storage matrix 92 comprises a 12 × 16 array of *W* storage cells each of which are connected directly to a mask driver unit. The inverse of each of these cells is connected to another mask driver for the same cell location — i.e., there is a "*B*" and a "*W*" mask driver for each cell.

To reduce the possibility of erroneous recognition due to slight vertical misalignment of cell data applied to the mask drivers, the top 16 cells in the array of data from the primary storage register, which is 18 cells in height, is shifted first into the secondary storage as an "up jitter" position. Next, the central 16 cells are shifted as a "center jitter" position and finally the bottom 16 cells are shifted as a "down jitter" configuration. In this manner any slight misalignment of one cell up or down is compensated for and the highest output level, i.e., the most likely jitter configuration, is employed in the recognition of the character.

The mask drivers 93 apply the cell data from the secondary storage matrix 92 to a plurality of character masks 94. There is one black mask and one white mask for each character to be recognized by the recognition unit. Cell array data is applied with the black cell information connected to the white masks and the white cell information connected to the black masks. The output of all of the masks are examined as character data is applied to them by a plurality of peak amplifiers 95. The mask which produces the highest output signal is selected as corresponding to the most likely character undergoing recognition. Once a recognition decision, or an inability to recognize the character is determined the data is stored within a plurality of character storage flip-flops 96 and subsequently transmitted to the control computer 97 for usage or further storage.

Figure 4:
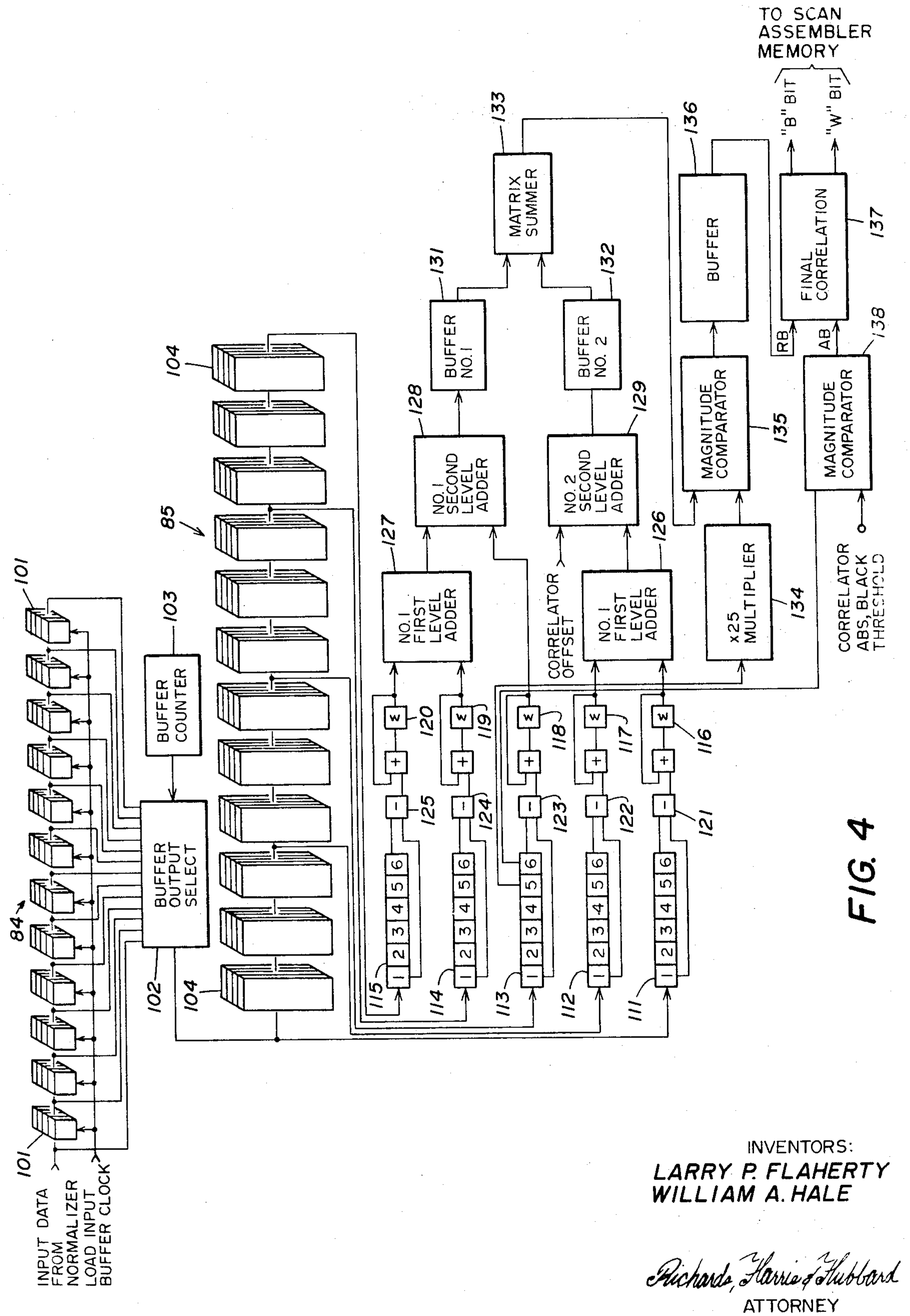
FIG. 4 is a block diagram of the input and correlation circuitry shown in FIG. 3.

Referring now in more detail to the specific circuitry employed in the recognition unit of the present invention, the input buffer and correlation circuitry is illustrated in FIG. 4.

Input Buffer

The process control logic for the present recognition unit requires that during certain periods of the scan cycle no input data be loaded into the correlator memory 85. Because of this requirement an input interface buffer 84 is used to temporarily store the serial stream of incoming data from the normalizer. The buffer 84 comprises 12 parallel four bit shift registers 101 which form a single 12 stage, four bit register. Input data from the normalizer, which comprises the serial stream of four bit cell data words, is shifted into and through the four bit shift register stages in synchronism with a load input buffer signal from the process control computer. Each one of the stages is connected to the input side of a buffer output select unit 102. Under control of a buffer counter 103 and selection logic the serial stream of input data words is converted to parallel data and shifted into the first stage 104 of the correlator memory 85.

Correlator

The correlator memory comprises 12 stages, each of which stores a column of 48 four bit data words. Each stage stores all of the data words gathered during one complete character scanning operation. Each stage of the correlator memory 85 also includes a temporary memory buffer unit. The buffer counter 103 indicates the location of the earliest unwritten data word in the input interface buffer 84. Before each data word of each scan is written from the buffer, under control of the buffer counter and selection logic into the correlator memory, the appropriate row address if first presented to all columns 85 of the memory. Information which was written in the currently addressed row during the immediately preceeding scan appear at the output of each of the memory elements. The stored data bits are then temporarily loaded into the associated memory buffer storage elements and new data is written into the address bit location of each column. The previously stored old data is then placed in the next column.

Every third stage of the correlator memory 85 is connected to the correlator arithmetic unit 86. Since each cell width of area of the character image is scanned three times, data from a completely different but adjacent character area is stored within every third stage.

The purpose of the prerecognition processing performed by the correlator is to enhance the signal-to-noise ratio of the input data, by making decisions of the comparative blackness or whiteness of the cell data to be stored and recognized. The correlator employs an adaptive threshold method to determine the relative black or white data associated with each cell or data point. An adaptive threshold is computed from each point using a small local set of data points surrounding the data point under analysis. A square area surrounding the data point for which the threshold is to be computed is compared to the central cell and a decision made as to its relative blackness or whiteness. The threshold with which each cell is compared is equal to the average of the surrounding 25 cell values, including the data point cell, offset biased in the black direction by a programmed quantity.

If the cell value exceeds the programmed threshold then a relative black RB logic signal is set to a logic "1". The value of the individual center cell data point under analysis is also compared to a program selectable absolute black threshold. If the cell value exceeds the absolute black value then an absolute black *AB* logic signal is set to a logic "1".

The purpose of the generation of the *RB* and *AB* logic signals is to determine and generate black ("*B*") and white ("W") outputs for each and every cell comprising the character array. The *B* signal is then loaded into further storage arrays and applied to sets of template masks to recognize the character being scanned. The intent of the correlation is to insure an absolute black or white signal for a particular cell before that cell will affect the template masks. A white output ($W=1$) requires that neither the *RB* nor the *AB* signals be a logic 1. If no white condition exists then the cell is automatically defined as a black ($B = 1$). That is, if either the *RB* or *AB* signals are logic 1 then the *B* signal is a logic 1. Thus the black and white signals are automatically defined as complements of one another.

In one embodiment of the present recognition unit, the correlation logic circuitry is capable of handling data words at a $12MH_z$ rate. Considering a scan to be a vertical slice of information from the character data stream consisting of 48 cell samples, the maximum scan rate is $250KH_z$. Because of data storage and timing requirements required in the correlation logic, there is a delay of six scans and six data clocks from real time prior to entering input data from the correlator into the scan assembler memory 87. This, however, has no effect on the decision logic but does require that the retina data processor and scanner read a minimum of three cell widths (nine scans) beyond the last information in a given data field to insure that all information will be processed and read. An additional 21 scans is required to force the decision from the decisional logic, which has inherent delay from real time due to the processing.

As mentioned above in connection with FIG. 4, the cell data words are loaded into the correlator memory 85 by temporarily storing information at a given address prior to inserting new information at that address and then the temporarily stored information is shifted on to the next stage 104 of the memory. The correlator memory stores information in parallel from 12 successive scans of a character. Because there are three scans made for each cell width of the character, the cell information is extracted from every third stage to insure that five adjacent individual views of vertical sections of the character are placed into the correlator arithmetic unit 86. Corresponding cells from each of the adjacent five scans are shifted into five individual, six level shift registers 91–95. The value of the first five input words of each scan of each column are summed in accumulators 116–120. As the sixth value is added to the sum of the previous five, the first value, that is the cell value stored in stage 1 of the shift registers 91 – 95 is simultaneously subtracted by subtractors 121 – 125 from the sum. This procedure is repeated for all subsequent words of each individual scan and a five cell running sum is maintained for each of the five cell columns.

The sums of each one of the individual columns of the scans are in turn also summed through a plurality of levels of adders so a composite five horizontal by five vertical sum of the array is produced. The sums from the registers 91 and 92 are added in a first level adder 126 while the sums from registers 94 and 95 are added in another first level adder 127. The output of the first level adder 127 and the sum from register 93 are combined in a second level adder 128. The output of the first level adder 127 is added to a correlator offset value from the process control computer in another second level adder 129. The outputs from the two second level adders 128 and 129 pass through respective buffers 131 and 132 and are added in a matrix summer 133. The buffers 131 and 132 between the second level adders 128 and 129 and the matrix summer 133 are included to eliminate decoding spikes and circuit delays accumulated through two levels of addition. The buffers introduce one clock period delay in the data stream through the matrix summer logic.

The center cell from shift register 93, (now word no. five in the fifth level of the register 93) is then multiplied by 25, in a multiplier 134 rather than dividing the sum by 25 to achieve an average value, and the magnitude of the product is compared with the sum from the matrix array in a comparator 135. A "1" bit is produced if the cell value is greater than the average of all the sums which was previously offset in the second level adder by a programmed correlator offset value from the process control computer. If the magnitude of the center cell is greater than that of the average surrounding values then a relative black bit *RB* is produced for that particular cell and passed through a one bit buffer 136 to the final correlation logic 137. On the next consecutive clock pulse the same center cell, which is still in the center shift register 93 but is now shifted to the sixth level of that register, is compared to the correlator absolute black threshold from the process control computer in a digital amplitude comparator 138. An absolute black *AB* bit is produced if the cell value is greater than that of the absolute black threshold. The *AB* value is also presented to the final correlation logic 137, along with *RB* from the buffer 137, and a white bit is produced if neither an *AB* nor an *RB* signal are present. If either one of the two signals is present then a black *B* signal is produced for that particular cell.

Scan Assembler Memory

Figure 5:
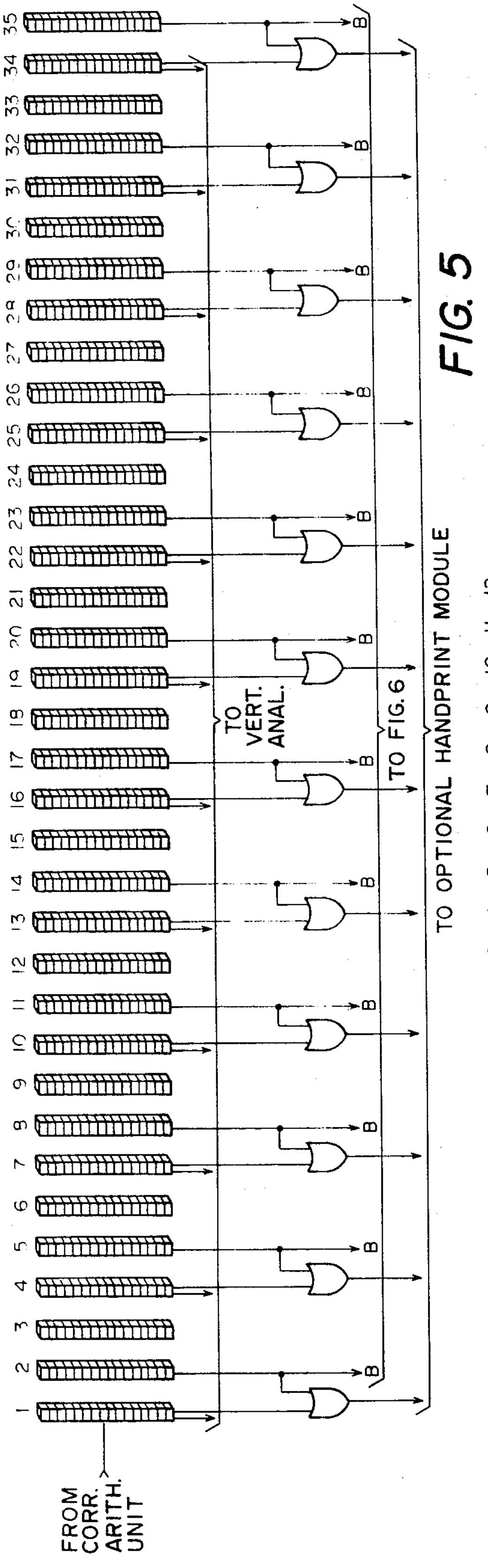
FIG. 5 is a diagram of the scan assembler memory shown in FIG. 3.
Figure 6:
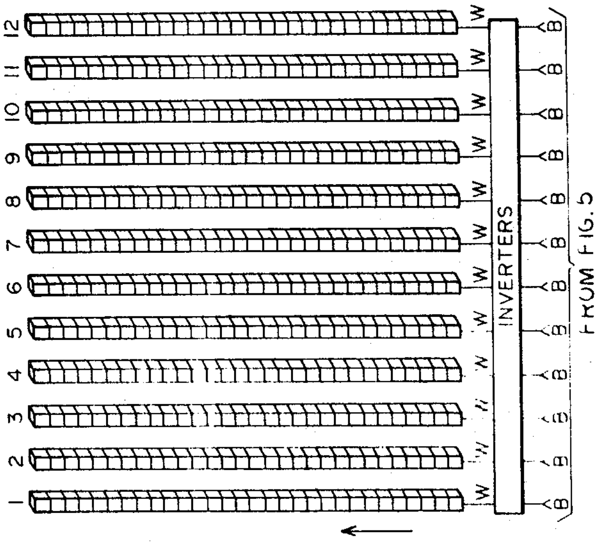
FIG. 6 is a diagram of the mosaic primary storage matrix shown in FIG. 3.

As the data is reduced to black and white bits for each one of the individual cells comprising each scan of the character, the data is then loaded into the scan assembler memory 87, FIG. 5, comprising one bit plane of 35, 48 bit columns per plane. As each word scan is written, all previous data is shifted row by row to the next column similar to the operation of the correlator memory. As shown in FIG. 5 the scan assembler memory 87 in turn supplied the "*W*" cell data to the mosaic primary storage register 89 shown in FIG. 6 by shifting information from the bottom of the mosaic upward in the storage registers. The information is shifted into the mosaic register 89 during a special load mosaic operation during which no new data is being written into the scan assembler memory 87 or the corrector memory 85 and the memory buffers are inactive. The *W* outputs originate at the appropriate memory element outputs.

Vertical analyzer

Information is shifted from the scan assembler memory 87 into the mosaic primary storage 89 under control of the vertical analyzer 88 so that only the appropriate rows of the 48 row of character data occupying approximately 16 rows is shifted into the mosaic. The scan assembler stores a quantity of data equivalent to three vertical character heights. The function of the vertical position determination hardware is to examine the scan assembler to find the location in the scan assembler memory 87 of the center of the character to be read. This information is used to access the 18 locations surrounding the character center for transfer to the mosaic register 89. The "*B*" bit of the scan assembler contains the black/white information used to make this determination.

Figure 7:
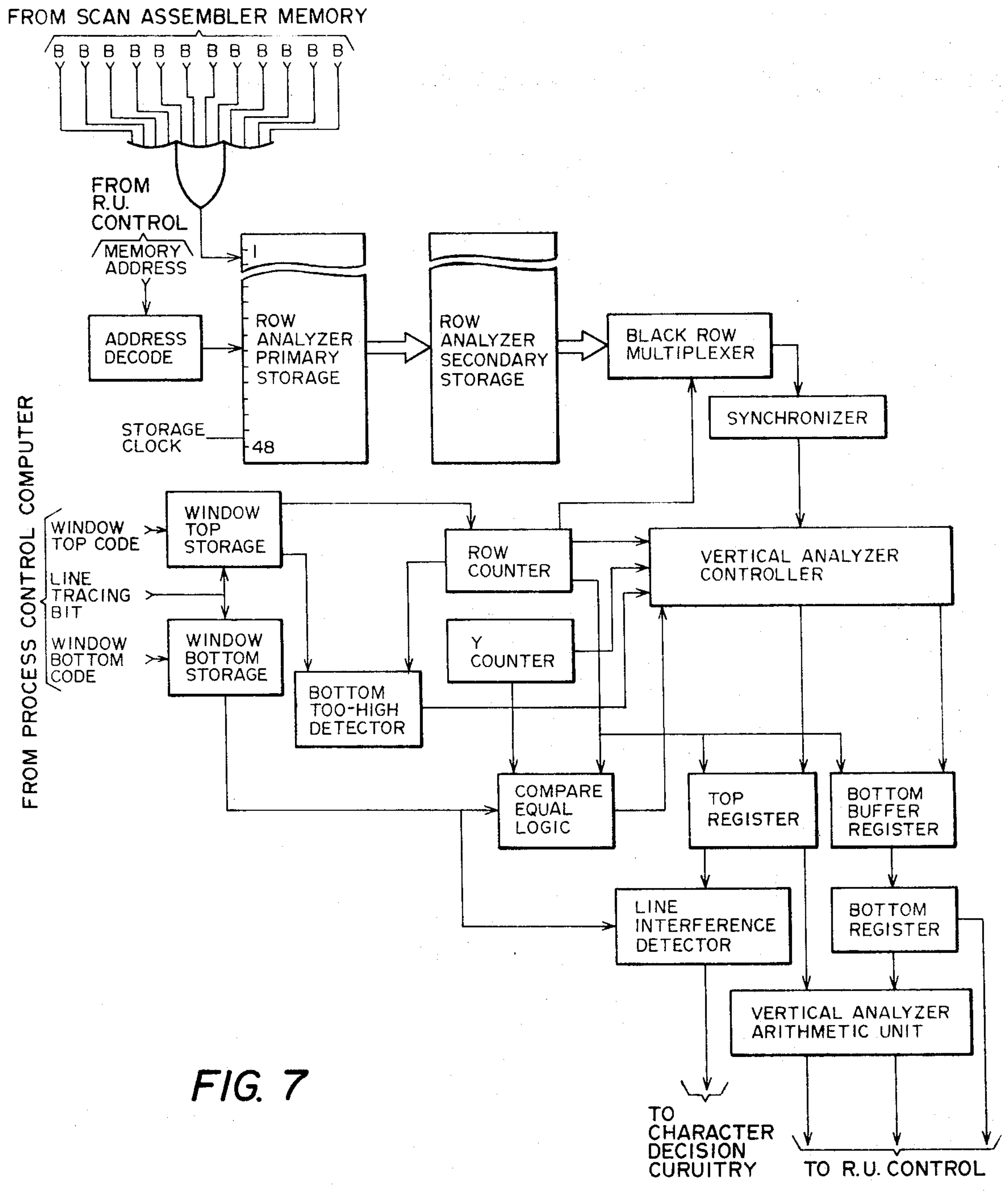
FIG. 7 is a block diagram of the vertical analyzer circuitry shown in FIG. 3.

As illustrated in the block diagram of FIG. 7, the data for a scan is entered into the scan assembler. The "*B*" bit of 12 cells, i.e., one row of the scan assembler is transmitted to the vertical determination logic. The data transmitted is located one character sample ahead of the data being sent to the mosaic for recognition purposes. The row analyzer section of the vertical determination logic accepts the 12 bits of information and logically *OR*'s the data to generate a row black/white indication which is stored for vertical analysis. A programmable control bit may be employed to force the exclusion of cell 1 and cell 12 from the row analysis when the bit is set to a logic "1". This feautre allows correct vertical analyzation of characters less than 12 columns wide, spaced less than 12 columns apart. The vertical analysis section of the vertical determination logic monitors the row black/white storage during the next scan and establishes the location of character tops, bottoms and centers according to the program selected definitions for these parameters. The final result of vertical analysis is the generation of a mosaic top address that is used to initiate the transfer of the character containing, 18 row segment of the scan assembler to the mosaic at the end of the scan. Vertical analysis is performed by the row analyzer flip-flops for the present character sample on a row by row basis. After the vertical analysis data is extracted, the row analysis data is replaced by data for the next character sample in the same cell time.

The position analysis logic detects certain undesired conditions of character tops and bottoms before center calculations are performed. For example, if during any scan the detected bottom of any top/bottom combination falls within 9 cells of the specified analyzation window top, then a bottom-too-high condition exists and the top/bottom combination is discarded, and another, lower top/bottom combination (if any) is detected. Also, if during any scan the detected top of any top/-bottom combination falls within 14 cells of the specified analyzation window bottom, a "line interference" signal is generated.

Figure 8:
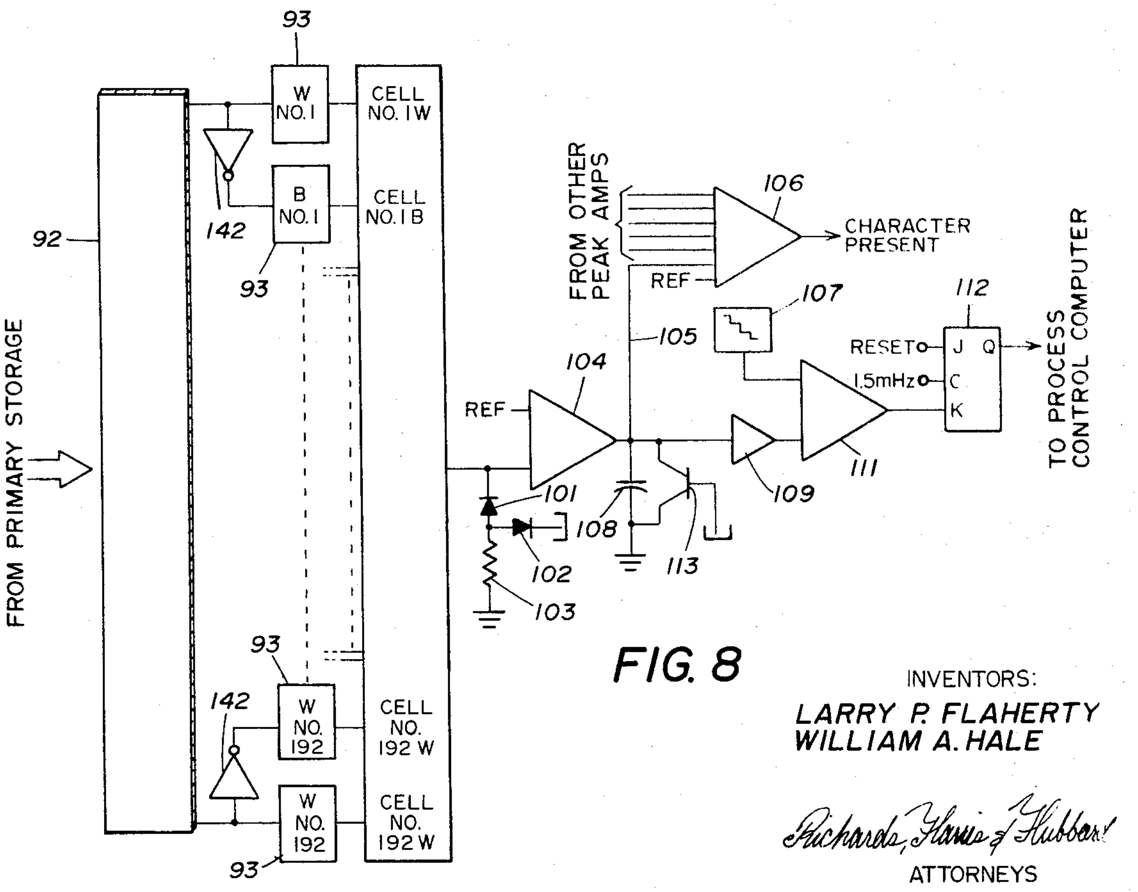
FIG. 8 is a schematic diagram of the mosaic secondary storage matrix, the character mask sets and an illustrative peak amplifier recognition system.

Vertical analysis data is then forwarded to a mosaic control system (not shown) which controls the shifting of information from the scan assembler memory into the mosaic primary storage register 189 of FIG. 8. Once the information of black/white condition is issued into the primary storage mosaic register 89 from the bottom of the registers it is in turn shifted into the secondary mosaic array 92 from whence it is applied to the mask drivers.

Mask Drivers and Masks

The input to the classification portion of the present recognition unit comes into the mask drivers 93 from the mosaic secondary storage 92 in the form of a parallel 12 × 16 matrix representing the white portion of the character and the inverted white bits for a parallel 12 × 16 matrix representing the black portion. A logic "1" in a matrix position represents the presence of a black or white cell in the respective matrices.

Data is transferred from the secondary storage to 192 black mask drivers and 192 white mask drivers. Each mask driver 93 is a current driving device and has the capability to drive in parallel its positional input to all of the masks in the system. One embodiment of the system includes a maximum of 360 masks in the vocabulary. The white mosaic data drives the black masks while the inverters 142 produce the inverse of the white mosaic data to drive the white masks. The signal from the mosaic temporary storage is applied to mask drivers for all the mask sets simultaneously. The outputs of the two masks are combined together to give a single output signal for each character. Each cell position in the mosaic temporary storage has two associated mask drivers which power the corresponding positional white and black input on all masks of the system. For example, row 1, column 1 of the mosaic temporary storage is fed to two individual mask drivers which power the row 1, column 1 input of all the white masks and, after inversion, row 1, column 1 input of all black masks in the system.

Each of the template masks comprises a parallel array of resistors, with one lead of all resistors connected together. The other lead of each resistor accepts an output from a mask driver as the voltage level representing black or white from the mosaic temporary storage. If all of the resistors have the same value and all the inputs are the same voltage value the output of the array is equal to the value of the input. This is a condition of perfect match and is the condition sought in the template recognition process. Each mask of the system has a black mask section and a white mask section and each group has a space for an array of 192 input resistors. However, in actuality the black section of the mask only contains input resistors for the cells where black of the characters is expected and the white masks contain input resistors in those areas where the white is expected. In the analysis of a character, the particular font style of the character is known along with the group within that font and whether character under analysis is alphabetical, numeric or special. The process control computer supplies an indication signal to enable the peak amplifier circuitry corresponding to likely character.

Referring now to FIGS. **9*a* – 9*f*, there is shown a simplified mask containing only 15 positions of the black section and 15 positions of the white section and it is merely illustrative of an actual mask of the present system which comprises a 12 × 16 array totaling 192 positions in each section. The masks of FIG. 9*a*** represent the character "*H*" which has been extracted from a document, processed by the correlator and stored in the scan assembler memory.

FIG. **9*b* represents the mosaic secondary storage with bits set in positions where there is white in the mosaic. FIG. 9*c* represents the inverse of the black mosaic secondary storage with bits set in positions where there is black in the mosaic. FIG. 9*d*** represents the black mask for recognition of the character "*H*" and FIG. **9*e*** represents the white masks for recognition of the character "*H*".

At the end of each scan, the mosaic temporary secondary storage is loaded with new data. During the four microseconds next following a loading operation three new "pictures" are presented to the mask by the mosaic secondary storage, each picture lasting 1.3 microseconds. The multipicture presentation is accomplished by a jitter function in which the picture is moved up one row at a time at 1.3 microsecond intervals to compensate for any slight vertical misalignment which may have occurred during the prior processing function.

As shown in FIG. 8, each bit position of the black and white planes of the mosaic temporary storage is input to a mask driver 142 and 143 respectively. The set logic 1 bits produce a zero voltage level out of the driver while the logic zero bits produce a minus five volt value from the driver. The circuit operation of the mask requires that the mask input be summed to produce a minus five volt mask output for a perfect match condition.

The mosaic temporary storage drives the black masks while the inverse of the data in storage drives the white masks to insure that in the event that the corresponding bits in the mosaic and the inverse thereof are both zero, indicating a no black/white decision, the mask peak output will not be effective. FIG. **9*f*** represents the resistor summing network of the illustrative "*H*" character. Resistors are indicated in the cell positions of the masks shown in FIGS. **9*d* and 9*e*. In the example of FIG. 9*f*** resistor inputs to the masks are a −5 volts, then the mask output will also be −5 volts indicating a perfect match condition. A mismatch, in which a zero volt input was present at one or more of the resistors would pull the mask output from a −5 volts toward zero volts. The character data output of the mosaic temporary storage is presented to all masks simultaneously and logic decision circuitry is provided to select the largest mask peaks to provide a character decision.

Figure 9:
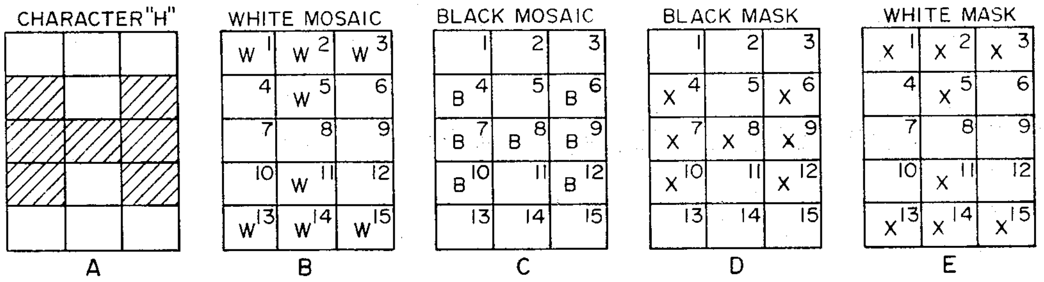
FIG. 9 is an illustrative diagram of a character mask set.
Figure 9:
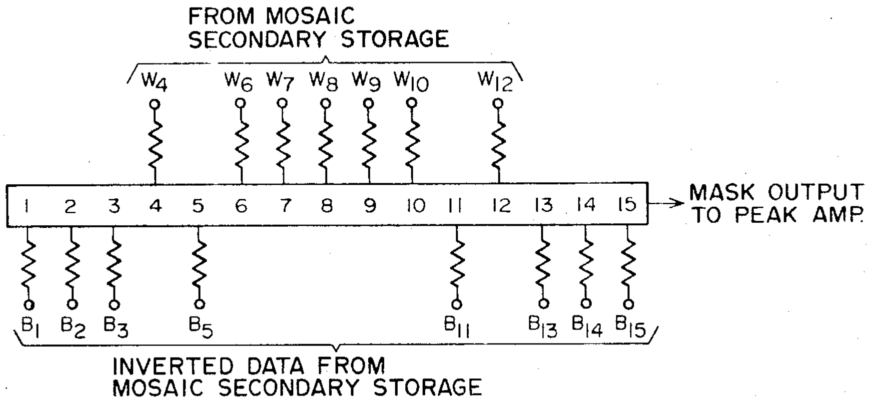

The illustrative example of FIG. 9 assumes that all resistor values of the mask are of the same value; however, in actual mask design different weights are assigned to resistors in critical mask positions to enhance the reading of certain characters and prevent an output indicating more than one character.

Character Decision Circuitry

As shown in FIG. 8 there is one peak amplifier 104 for each combined black/white character mask set. The input of each of the peak amplifiers 104 includes a pair of diodes 101 and 102 which are connected to ground through a resistor 103. Normally, a disabling ground signal is applied to the diode 102 so that the peak amplifier circuitry will not respond regardless of the input signal supplied. However, when a character is to be recognized a negative voltage enabling signal is applied to the cathode of input diodes 102 of the peak amplifiers which correspond to the particular font and group codes being read to permit peaking signals from the mask sets corresponding to those particular peak amplifiers to pass.

Voltage peaks from the mask sets vary from zero volts to a −5 volts depending upon the degree of match between the data and particular masks. The mask peaks are applied to one of the inputs of a comparator 104. The other input of the comparator 104 has applied thereto a voltage equivalent to approximately 85 percent of the value of a perfect peak, i.e., in this case, a −4.25 volts. If the output peak from the mask is greater than the 85 percent signal voltage, the peak is amplified by a factor of six and a character presence signal is impressed upon line 105. All of the character presence signals from the different peak amplifiers are *OR*'d together in gate 106 and used to anable other circuitry common to several peak amplifiers to perform further processing functions such as energizing a staircase generator 107 for character detection and enabling drop-out detection circuitry. The character presence output signal from the comparator 104 is stored as a charge upon a capacitor 108 and passes through a unity gain isolation amplifier 109 into one of the outputs of a threshold comparator 111. The staircase generator 107 supplies a decreasing voltage signal from a value of90 percent of a perfect peak to the other input of the threshold comparator 111. By counting the number of steps which the staircase generator must make before the voltage values on the two comparator leads are equivalent, it is determined whether the peak from the mask set is equivalent to approximately 90 percent of a perfect peak and therefore with reasonable probability it can be concluded that that particular character has been detected.

Each peak amplifier for each character also has a corresponding flip-flop 112 associated therewith which the output from the threshold comparator 111 energizes to store and record the fact that that particular character has been detected. The output from the flip-flop is periodically sampled or is passed to the process control computer which stores and utilizes the recognition information. At the end of a character detection it is desired to reset the peak amplifier circuitry and a signal from the process control computer is applied to the base of a transistor 113 which is connected across the storage capacitor 108. The transistor 113 shunts any voltage stored upon the capacitor 108 and prepares the capacitor for the receipt of a new peak corresponding to the next succeeding character.

The document feeder and its operation are described and claimed in co-pending application, Ser. No. 159,141 filed July 2, 1971 by Alton H. Mayer and Willian C. Monday.

The document stacker and its operation are described and claimed in co-pending application, Ser. No. 159,216 filed July 2, 1971 by Willian C. Monday.

The document transporter and scanning system and its operation are described and claimed in co-pending application, Ser. No. 166,736, filed July 28, 1971 by Jack Edward Balko, John Edward Blair, Jerry Leon Bybee, William Francis Fuhrmeister and Richard Theodore Kushmaul.

The normalizer and it operation are described and claimed in co-pending application, Ser. No. 166,811 filed July 28, 1971 by Dale DuVall and Chester Borowski.

Having described the invention in connection with certain specific embodiments thereof, it is to be understood that further modifications may now suggest themselves to those skilled in the art and it is intended to cover such modifications as fall within the scope of the appended claims.

What is claimed is:

1. A method of correlating the comparative blackness of a data point cell within an array of cells which successively views each of a train of characters to generate a black/white decision signal for said cell comprising the steps of:

summing signals from a set of cells surrounding the data point cell with the signal from the data point cell;

biasing said sum in the black sense by a programmable quantity;

multiplying the signal from the data point cell by the number of cells in said set;

comparing the biased sum with the multiplied data point cell signal to generate a relative black signal if the cell value sum is the greater;

generating a programmable absolute black threshold signal;

comparing the data point cell signal with said absolute black threshold signal to generate an absolute black signal if the cell value signal is the greater;

generating a black output signal for the data point cell in response to the presence of either a relative black signal or an absolute black signal; and generating a white output signal for the data point cell in response to the absence of both a relative black signal and an absolute black signal.

2. A method set forth in claim 1 wherein the step of summing signals from surrounding cells includes the steps of:

shifting signals from adjacent cells through the respective ones of a plurality of multistage shift registers, the number of said registers being equal to one dimension of the surrounding cell array and the number of stages in each register being equal to the other orthogonal dimensions;

summing each signal as it is shifted out of the last stage of the respective registers;

subtracting the cell signals in each first stage from the register sum to form a running sum of all cell signals in the register; and summing and running sums of all the registers to form a composite matrix sum of surrounding cell signals.

3. A system for correlating the comparative blackness of a data point cell within an array of cells which successively view each of a train of characters to reach a black/white decision signal for said cell comprising:

means for summing signals from a set of cells surrounding the data point cell with the signal from the data point cell;

means for biasing said sum in the black direction by a programmable quantity;

means for multiplying the signal from the data point cell by the number of cells in said set;

means for comparing the biased sum with the multiplied data cell signal to generate a relative black signal if the cell value sum is the greater;

means for generating a programmable absolute black signal;

means for comparing the data point cell signal with said absolute black threshold signal to generate an absolute black signal if the cell value signal is the greater;

means for generating a black signal for the data point cell in response to the presence of either a relative black signal or an absolute black signal; and means for generating a white signal for the data point cell in response to the absence of both a relative black signal and an absolute black signal.

4. A system as set forth in claim 3 wherein said means for summing signals from surrounding cells includes;

means for shifting signals from adjacent cells through respective ones of a plurality of multistage shift registers, the number of said registers being equal to one dimension of the surrounding cell array and the number of stages in each register being equal to the other orthogonal dimension;

means for summing each signal as it is shifted out of the last stage of the respective register;

means for subtracting the cell signals in each first stage from the register sum to form a running sum of all cell signals in the register, and means for summing the running sums of all the registers to form a composite matrix sum of surrounding cell signals.

5. A system for recognizing characters from data samples of a vertical array of photocells comprising:

means for summing signals from a set of cells surrounding a data point cell with the signal from the said point cell, means for biasing said sum in the black sense by a programmable quantity, means for multiplying the signal from the data point cell by the number of cells in said set, means for comparing the biased sum with the multiplied data point cell signal to generate a relative black signal if the cell value sum is the greater, means for generating a programmable absolute black threshold signal, means for comparing the data point cell signal with said absolute black threshold signal to generate an absolute black signal if the cell value signal is the greater, means for generating a black output signal for the data point cell in response to the presence of either a relative black signal or an absolute black signal, means for generating a white output signal for the data point cell in response to the absence of both a relative black signal and an absolute black signal, means for simultaneously applying the white output signals to a plurality of black masks and for inverting the said white output signals and applying the signals to a plurality of white masks, means for monitoring the output voltage from the plurality of masks, means for comparing the output signals from selected masks with a first preselected threshold voltage signal and storing the output signal if it exceeds the threshold, means for amplifying said stored voltage signal, and means for comparing the amplified voltage with a second preselected voltage signal greater than said, first preselected signal and producing a character recognition signal representing the character associated with the particular mask being monitored.

6. A system for recognizing characters from data samples of a vertical array of photocells, comprising in combination:

means for correlating the data samples into a plane of white data samples associated with white areas of the vertical samples through the character, a plurality of black masks each representing a character to be recognized by the system and generating an output signal therefor, a plurality of white masks equal in number to said plurality of black masks and also individually associated with a character to be recognized by the system and generating an output signal therefor, means for inverting the white data samples into black data samples, means for simultaneously applying the white data samples to the plurality of black masks and the black data samples to the plurality of white masks, means for monitoring the output signals from the plurality of black and white masks, means for comparing the output signals from selected masks with a preselected threshold voltage signal, means for storing the output signal if it exceeds the threshold, and means for producing a character recognition signal from the stored output signal representing a character associated with a particular mask being monitored.

7. A system for recognizing a character as set forth in claim 6 wherein said means for monitoring includes means for summing the output voltage for a white mask for a particular character with the output voltage for the corresponding black mask for the same character.

8. A system for recognizing a character as set forth in claim 6 wherein said means for producing a character recognition signal includes means for comparing the output signals with a second preselected threshold voltage signal greater than said first preselected threshold voltage signal.

9. A system as set forth in claim 6 wherein the said monitoring means includes a peak amplifier associated with each mask set and wherein only selected groups of peak amplifiers are enabled for particular character groups.

10. A system as set forth in claim 6 which also includes means responsive to said stored output signal for producing a character present signal.

11. A system as set forth in claim 6 wherein said second preselected threshold voltage is produced by means for generating a descending staircase voltage and which also includes means for counting the number of steps of voltage descent before the compared voltages are equal.

12. A system for recognizing digitized data bit words produced by repeatedly scanning and sampling the outputs of a plurality of photocells during passage of an image of a character across the photocells, comprising:

means for converting a serial sample stream of data bit words, each of which represent a photocell output, into a set of parallel data words for each scan, means for storing the parallel data words from a plurality of successive scans in a first matrix array, means for correlating said parallel data words to produce either a black or white signal from each data bit word of the stored samples, primary means for storing the correlated signals in a matrix array, said primary means having positions slightly greater in number than the number of parallel data words stored in the first matrix array, secondary means for storing the correlated signals, said secondary means having cells in number equal to the size of the character being scanned, means for shifting a plurality of overlapping segments of the black or white signals stored in the primary means into the secondary means to jitter the signals and eliminate error due to slight vertical misalignment of the character signals within the primary means, means for applying the stored correlated signals from the secondary means to a plurality of character mask sets, and means for monitoring the outputs from the plurality of mask sets to select the mask having the largest output response as being the one associated with the character comprising the stored signals.

13. A system as set forth in claim 12 wherein each retina scan includes signals from a number of sampled cells greater than the number of cells exposed to the character image and wherein said means for storing correlated data includes:

means for storing the correlated cell signals within an analysis matrix array having storage positions at least as large as the number of samples taken in the scan;

means for analyzing the signals stored within the matrix to determine the location of the character cells within the matrix; and means for shifting the matrix positions containing the character into a primary storage array having a number of positions approximately equal to the number of cells in the character.

* * * * *